Patented July 15, 1952

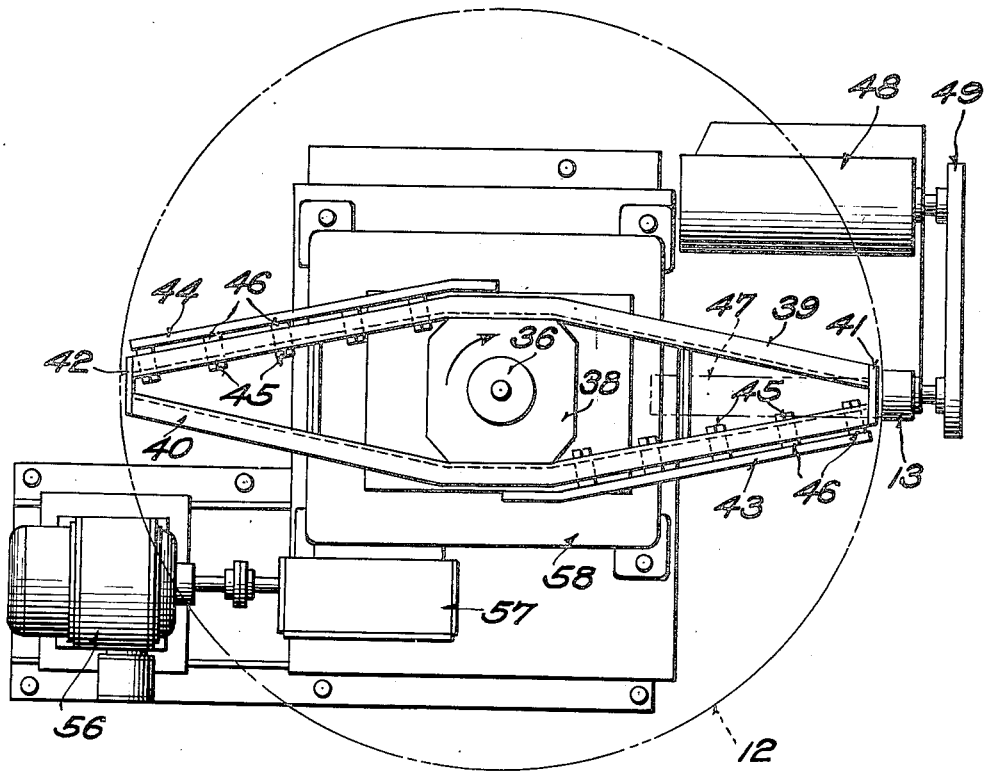

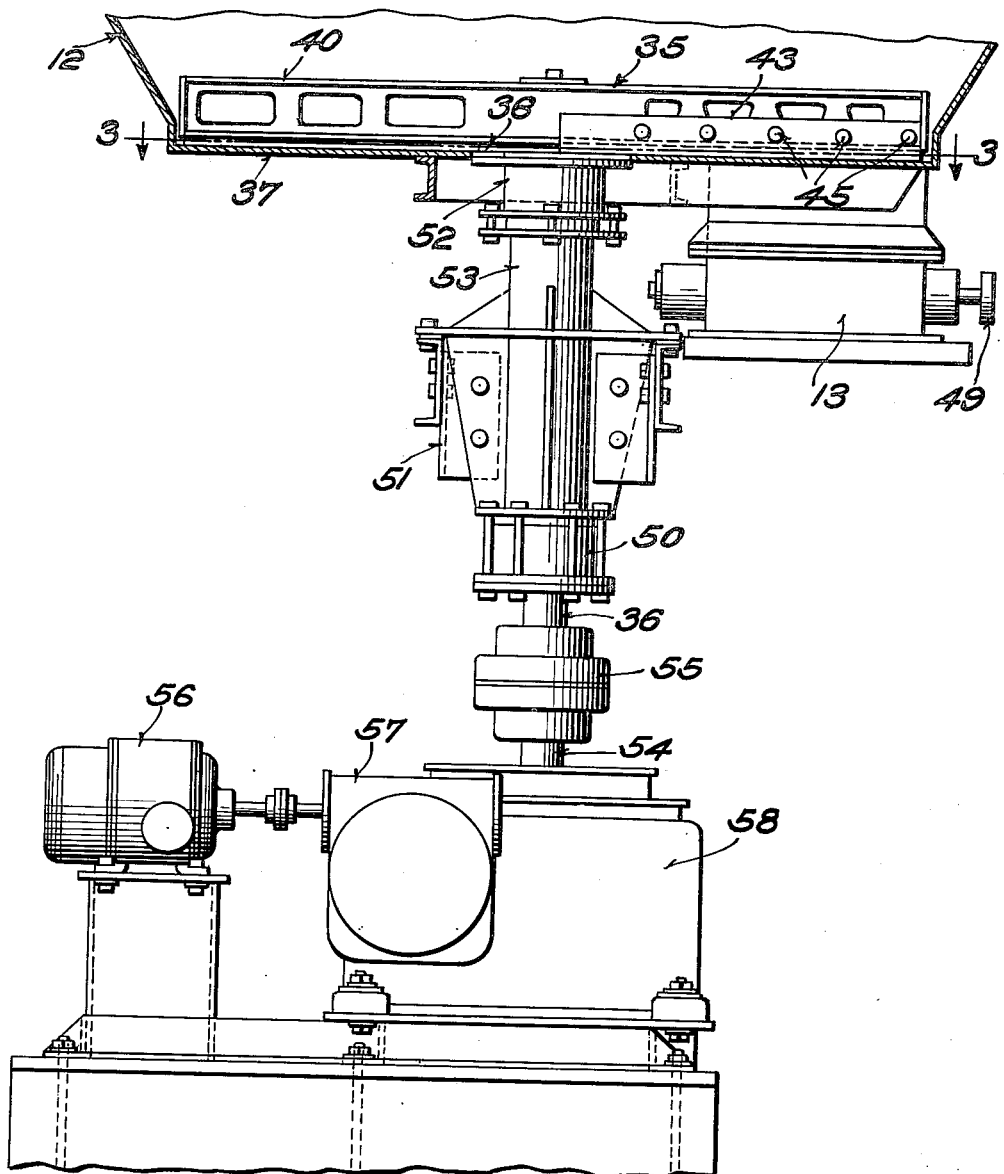

2,603,307

UNITED STATES PATENT OFFICE 2,603,307

APPARATUS FOR RECOVERY OF GAS-SUSPENDED SOLIDS

Harry L. Richardson, Prospect Park, Pa., assignor to Research Corporation, New York, N. Y., a corporation of New York Application April 6, 1950, Serial No. 154,300

1 Claim. (Cl. 183—7)

This invention relates to an apparatus for recovery of gas-suspended solids and more particularly to a method for recovering fume and dust normally carried in the gases issuing from blast furnaces, especially a ferro-manganese blast furnace.

An object of the invention is to provide an apparatus for the recovery of fume from ferro-manganese blast furnace gases whereby to abate the industrial nuisance and hazard involved in exhausting the fume-containing gases to the atmosphere and to effect economies in the operation of ferro-manganese blast furnaces.

Electrical precipitation has been employed for removing fume from ferro-manganese blast furnace gases. The precipitated fume is so light and fluffy that it cannot be handled satisfactorily in subsequent treatment processes. Moreover, the fluffy fume ignites an exposure to air and tends to fuse and stick to the surfaces of any conveyor device employed for its transportation. The fume also contains a small percentage of objectionable organic compounds. Altogether, the properties of the fume make it a very difficult material to process successfully.

In accordance with the invention the fume is recovered from blast furnace gases by electrically precipitating the fume from a stream of such gases upon an extended electrode surface, removing the precipitated fume from such surface, subjecting the removed fume to a mechanical densifying operation in an atmosphere of low oxygen content, such as an atmosphere of ferro-manganese blast furnace gases, and removing the densified fume from the atmosphere of furnace gases.

The precipitation step preferably is preceded by a conditioning step in which the hot furnace gases are cooled somewhat and humidified by spraying them with water. The mechanical densifying step preferably is performed in a section of the precipitator positioned below the precipitator electrodes and communicating directly with the precipitating zone, the densifying section being filled with a more or less quiescent atmosphere of furnace gases.

The densifying action may be accomplished by any means capable of subjecting the collected fume to stirring or rolling. Preferably, relatively slowly moving devices are employed to minimize resuspension of the fume in the gases, and devices such as plows, spiral conveyors or the like which gradually transport the fume to an outlet point while subjecting it to rolling, stirring or the like are particularly advantageous.

The objects of the invention are realized in an apparatus for recovering fume from blast furnace gases as exemplified in the following detailed description taken with the accompanying drawings, in which:

Fig. 1 is a somewhat diagrammatic view of a system for recovering fume contained in the exhaust gases of a ferro-manganese blast furnace, which system utilizes the process of the invention;

Fig. 2 is an enlarged elevational view, partly in section, of the fume-densifying section of the electrical precipitator used in the system of Fig. 1 and cooperating fume-densifying apparatus; and Fig. 3 is a horizontal section taken along the line 3—3 of Fig. 2.

Referring to the drawings, particularly to Fig. 1 thereof, the fume-recovery system shown includes a spray tower 10, and an electrical precipitator 11 having a densifying chamber 12 in the lower portion thereof. Densified fume from the chamber 12 is discharged through a star valve 13. The manganous compounds in the collected material as discharged through the valve 13 are unstable and will pyrophor or burn on contact with air or oxygen, particularly at elevated temperatures. To provide a stable material for further handling, the discharged material is burned in an oxidizing atmosphere as the first step in the preparation of the material for reuse. The densified material discharged through the star valve 13 is ideally conditioned for ignition and subsequent treatment.

The spray tower 10 has a gas inlet 28 through which exhaust gas from the ferro-manganese furnace is admitted to the fume-recovery system. The tower is equipped with spray heads 29 supplied with water under pressure from pipes 30 and 30a and the spray heads direct sprays of water into upflowing gases in the tower to cool and humidify the gases and fume preparatory to electrical precipitation. Hot gases from the blase furnace typically enter the spray tower at a temperature of from 450° F. to 700° F. and the temperature is reduced in the spray tower to from 300° F. to 370° F. Sufficient moisture is sprayed into the furnace gases to provide a minimum critical moisture content of approximately 16 per cent water vapor by volume of the gases leaving the spray tower. Higher values of water vapor content of the gases are permissible. Humidifying and cooling the gases improves precipitator operation and efficiency.

The preconditioned gases are conducted from the spray tower to the electrical precipitator 11 through a conduit 31. The gases flow through the precipitator in the direction of the arrows and are exhausted therefrom in a clean condition through a gas outlet 32. The cleaned gases may be passed to a conventional stack (not shown) for dispersion in the atmosphere.

The electrical precipitator 11 may be of any usual type and, as shown, includes the extended surface or plate electrodes 33 and complementary discharge electrodes 34. Conventional electrode cleaning means (not shown) such as electrode rappers, scrapers or vibrators may be employed to remove deposits of precipitated fume from the electrodes.

The deposit of fluffy fume which contains occluded gas and has an apparent density of only about 3 to 5 pounds per cubic foot falls from the electrodes into the densifying chamber 12 below the precipitating section. This chamber, which is in direct communication with the precipitating section, is filled with an atmosphere of relatively quiescent blast furnace gas which furnishes a protective atmosphere for the precipitated fume.

A rotary rabble or plow 35 is located in the bottom of the densifying chamber and is mounted on a vertical driving shaft 36 for horizontal rotation over the floor 37 of the chamber. The plow rolls, compacts and compresses the fluffy precipitate and beats and forces the gas out of the material raising its apparent density to about 12 to 15 pounds per cubic foot or higher. Densified fume is discharged from the bottom of the densifying chamber through the star valve 13.

Referring to Figs. 2 and 3, the rabble has a hub 38 fixed to the shaft 36. A pair of horizontally extending channel members 39 and 40 are attached to the hub, as by welding, at their centers and project outwardly and towards each other to provide diametrically opposed arms. The ends of the channel members 39 and 40 are welded to end plates 41 and 42. The hub and arm assembly rotates in the direction of the arrow shown in Fig. 3.

In Fig. 2, it will be observed that the bottoms of the channel members 39 and 40 are clear of the floor 37 of the densifying chamber. Plow blades 43 and 44 that scrape the bottom of the chamber and extend substantially vertically upwards from the floor are secured to the leading edges of the rabble arms by bolts 45. The blades are formed of heavy plate stock and are spaced in front of the channel members 39 and 40 by washers or sleeves 46. It will be seen in Fig. 3 that the leading faces of the plow blades are inclined rearwardly to the direction of motion of the rabble in an outward direction from the center so that fume being worked by the blades is pushed in a generally spiral direction away from the center of the floor of the densifying chamber and towards the outlet 47 leading to the star valve.

A motor 48 drives the star valve 13 through a belt drive 49 and the rate of discharge of compacted fume from the densifying chamber 12 is regulated to the desired value by the speed of the motor.

The rabble drive shaft 36 is supported near the bottom in a thrust bearing 50 carried by a frame 51 and is journalled near the top in a bearing 52 carried by a sleeve 53 that is also supported by the frame 51. Rabble shaft 36 is drivingly connected to a stub shaft 54 by a coupling 55, the stub shaft being driven by the electric motor 56 through speed reducing gear including a first worm and wheel in the housing 57 and a second worm and wheel in the housing 58.

In operation, ferro-manganese blast furnace gas containing the usual fume and dust and at a temperature of from about 500° F. to 700° F. is conducted into the spray tower 10 through the inlet 28. In the tower the gas is cooled by sprays of water to a temperature of from about 300° F. to 370° F. and the thus conditioned gas is conducted to the electrical precipitator 11.

The complementary electrodes 33 and 34 are energized and the gas in passing between the electrodes is substantially relieved of its burden of fume which is collected on the electrodes as a light, fluffy deposit.

The electrodes are rapped or vibrated to remove the deposit of fume which falls into the chamber 12 wherein it is worked in a blast furnace gas atmosphere by the plow blades to increase its apparent density from about 3 to 5 pounds per cubic foot to about 12 to 15 pounds per cubic foot.

The densified fume is discharged by the star valve 13 in condition to be readily processed in the subsequent apparatus of the recovery system.

From the foregoing description it will be seen that the present invention makes possible the ready recovery of fume from blast furnace gases, especially fume from ferro-manganese blast furnace gases. Although the invention is especially adapted to the treatment of ferro-manganese blast furnace gases, the gases from iron blast furnaces may also be treated to advantage by the apparatus.

I claim:

Apparatus for recovering suspended fume normally carried in ferro-manganese blast furnace gases which comprises means providing an electrical precipitation chamber including complementary discharge and collecting electrodes therein and means for directing a stream of blast furnace gases through said chamber, hopper means communicating with said precipitation chamber for the reception of precipitated fume, said hopper means having a substantially flat bottom, a rotary plow positioned to work over the bottom of said hopper, and valve means communicating with the lower zone of said hopper for discharging densified fume therefrom.

HARRY L. RICHARDSON.

REFERENCES CITED

The following references are of record in the file of this patent:

UNITED STATES PATENTS

| Number | Name | Date |
|---|---|---|
| 1,329,817 | Wolcott | Feb. 3, 1920 |